(12) United States Patent
Nishijima et al.

(10) Patent No.: US 12,065,038 B2
(45) Date of Patent: Aug. 20, 2024

(54) CONTROL DEVICE OF PERMANENT MAGNET TYPE ROTATING ELECTRICAL MACHINE

(71) Applicant: Mitsubishi Electric Corporation, Tokyo (JP)

(72) Inventors: Yoshimasa Nishijima, Tokyo (JP); Keiichi Enoki, Tokyo (JP); Shingo Harada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/645,085

(22) Filed: Dec. 20, 2021

(65) Prior Publication Data

US 2022/0258591 A1   Aug. 18, 2022

(30) Foreign Application Priority Data

Feb. 15, 2021   (JP) ................................. 2021-021419

(51) Int. Cl.
| | |
|---|---|
| *B60K 6/26* | (2007.10) |
| *B60L 15/02* | (2006.01) |
| *H02P 6/182* | (2016.01) |
| *H02P 21/26* | (2016.01) |
| *H02P 21/32* | (2016.01) |

(52) U.S. Cl.
CPC .............. *B60K 6/26* (2013.01); *B60L 15/025* (2013.01); *H02P 6/182* (2013.01); *H02P 21/26* (2016.02); *H02P 21/32* (2016.02)

(58) Field of Classification Search
CPC .......... H02P 21/14; H02P 27/08; H02P 21/20; H02P 21/18; H02P 21/22; H02P 21/0003; H02P 25/022
See application file for complete search history.

(56) References Cited

U.S. PATENT DOCUMENTS

2004/0061461 A1   4/2004   Tajima et al.

FOREIGN PATENT DOCUMENTS

| JP | 3688673 B2 | 8/2005 | |
|---|---|---|---|
| JP | 5642251 B2 | 12/2014 | |
| WO | WO-2018225139 A1 * | 12/2018 | .............. H02P 11/06 |

* cited by examiner

*Primary Examiner* — Said Bouziane
(74) *Attorney, Agent, or Firm* — Sughrue Mion, PLLC; Richard C. Turner

(57) ABSTRACT

The control device of the alternative rotating electrical machine is configured as follows. a d-axis current command value and a q-axis current command value are kept at zero in dq vector control, in the state where the alternative rotating electrical machine is rotating. A time during which the output of the middle point level judging means is Hi is counted. A duty is calculated out from the ratio with a carrier wave cycle, and a conversion is conducted into a two-axis rotating coordinate system (three-phase to two-phase conversion) from the calculated out duty and the magnetic pole position, to calculate out a two-phase signal. The magnetic pole position origin point correction amount is calculated out based on a predetermined operation equation, from the two-phase signal. A magnetic pole position origin point correction is performed based on the calculated out magnetic pole position correction amount.

12 Claims, 9 Drawing Sheets

CONTROL DEVICE OF PERMANENT MAGNET TYPE ROTATING ELECTRICAL MACHINE

FIELD OF THE INVENTION

The present application relates to a control device of a permanent magnet type rotating electrical machine.

BACKGROUND OF THE INVENTION

Permanent magnet type rotating electrical machines have a rotating magnetic field type structure, in which permanent magnets are provided in a rotor and armature windings are provided in a stator. This permanent magnet type rotating electrical machine achieves both functions; one is in the case where the rotating electrical machine is mounted in a hybrid car or the like, and functions as a dynamo in response to mechanical energy by an engine, and the other is in the case where the rotating electrical machine functions as an electric motor to generate driving forces in response to electric energy.

In general, in the case where the permanent magnet type rotating electrical machine, which is mounted in a vehicle, is driven as an electric motor, current flowing to an armature winding of the rotating electrical machine is controlled based on the magnetic pole position of a rotor, which is detected by a magnetic pole position sensing device, such as a synchronization resolver. However, when the detection value of the magnetic pole position is deviated from an actual magnetic pole position, by the attachment error or misalignment or the like of a magnetic pole position sensing device, there arises a subject that desired torque is not obtained.

To this subject, correction has been carried out so that the detection value by a magnetic pole position sensing device may match to the actual magnetic pole position of a rotor. For example, in the existing control device which is disclosed in the Patent Document 1, both of a d-axis current command value and a q-axis current command value in dq vector control are kept at zero, in the state where the rotor of a permanent magnet type rotating electrical machine is rotating. In addition, the control device performs the processing of the dq vector control, and calculates out a magnetic pole position correction amount, based on a predetermined operation equation, from the d-axis voltage command value and the q-axis voltage command value which are obtained at the runtime of the dq vector control. In this way, the magnetic pole detection position which is detected by the magnetic pole position sensing device is corrected.

Moreover, in the existing control device of a synchronous machine which is shown in the Patent Document 2, it is detected whether a vehicle is just about to make a stop or not. When the control device judges that the vehicle is just about to make a stop, a d-axis current command value and a q-axis current command value are assumed to be zero. Based on the d-axis voltage command value and the q-axis voltage command value of that time, the control device detects a phase difference with the detection phase of a magnetic pole position sensing device, and then, the detection phase is corrected based on the phase difference.

It is to be noted that, the control which is shown in the Patent document 1 and the Patent Document 2, is dq vector control. D-axis denotes a direction of magnetic flux (the central shaft of the permanent magnets) which a magnetic pole makes, and an axis (an axis between permanent magnets) which intersects perpendicularly with this d-axis electrically and magnetically is set as the q-axis. The dq vector control is the control of a rotating electrical machine which is performed on the dq coordinate system.

CITATION LIST

Patent Literature

Patent Document 1: Japanese Patent No. 3688673
Patent Document 2: Japanese Patent No. 5642251

SUMMARY OF THE INVENTION

Technical Problem

In the existing control devices which are disclosed in the Patent Document 1 and the Patent Document 2, both control devices calculate out the magnetic pole position correction amount from a d-axis voltage command value and a q-axis voltage command value.

After the d-axis voltage command value and the q-axis voltage command value are converted into a three-phase voltage command, dead time correction and the like is required to perform, in order to match the command voltage with an actual voltage. However, in some cases, error may arise between the command voltage and the actual voltage, since suitable correction cannot be performed due to the variety of elements. That is, when errors are included in the dead time correction, an error will be produced also in the magnetic pole position correction amount, which is calculated out based on the dead time correction.

In such a case, according to the methods which are indicated in the Patent Documents 1 and 2, the accuracy of calculated out magnetic pole position correction amount will be lowered.

In view of the existing faults which are mentioned above, the present application aims at offering a control device of a permanent magnet type rotating electrical machine, which reduces the deviation of a correction amount, when calculating out the magnetic pole position correction amount, and can perform accurately the magnetic pole position origin point correction.

Solution to Problem

A control device of a permanent magnet type rotating electrical machine according to the present application, the control device includes:
  magnetic pole position detection means which detects a magnetic pole position of the permanent magnet type rotating electrical machine,
  an inverter which carries out PWM control of switching elements based on a carrier wave and performs electric power conversion,
  middle point level judging means which detects a middle point potential between a switching element connected to an anode side of the inverter and a switching element connected to a cathode side of the inverter; compares the middle point potential and a reference potential; outputs as Hi, when the middle point potential is higher than the reference potential; and outputs as Lo when the middle point potential is lower than the reference potential, and
  magnetic pole position origin point correction amount operation means, wherein the magnetic pole position origin point correction amount operation means is the means which, keeping both of a d-axis current command value and a q-axis current command value at zero in dq vector control, in a state where the permanent magnet type rotating electrical machine is rotating, counts a time during which an output of the middle point level judging means is Hi and calculates out a duty value from a ratio with a carrier wave cycle; converts from the calculated out duty value and the magnetic pole position into a two-axis rotating coordinate system and calculates out a two-phase signal; and calculates out a magnetic pole position origin point correction amount from the two-phase signal, and wherein the magnetic pole position origin point correction amount operation means performs a magnetic pole position origin point correction by the calculated out magnetic pole position origin point correction amount.

Advantageous Effects of Invention

According to the control device of the permanent magnet type rotating electrical machine in accordance with the present application, the magnetic pole position origin point correction can be performed with a sufficient accuracy, based on the magnetic pole position correction amount which is calculated out from the two-phase signal.

DESCRIPTION OF EMBODIMENTS

[Overall Construction]

Hereinafter, with reference to drawings, explanation will be made about the Embodiment of the control device of a permanent magnet type rotating electrical machine, in accordance with the present application. It is to be noted that, in the following Embodiment, explanation is made about a case where the permanent magnet type rotating electrical machine is explained as a motor, and, in addition, the control device of the permanent magnet type rotating electrical machine is explained as a motor control device, which is mounted in a hybrid car. However, it is evident that the motor control device is allowed to be mounted in a vehicle other than a hybrid car.

Figure 1:
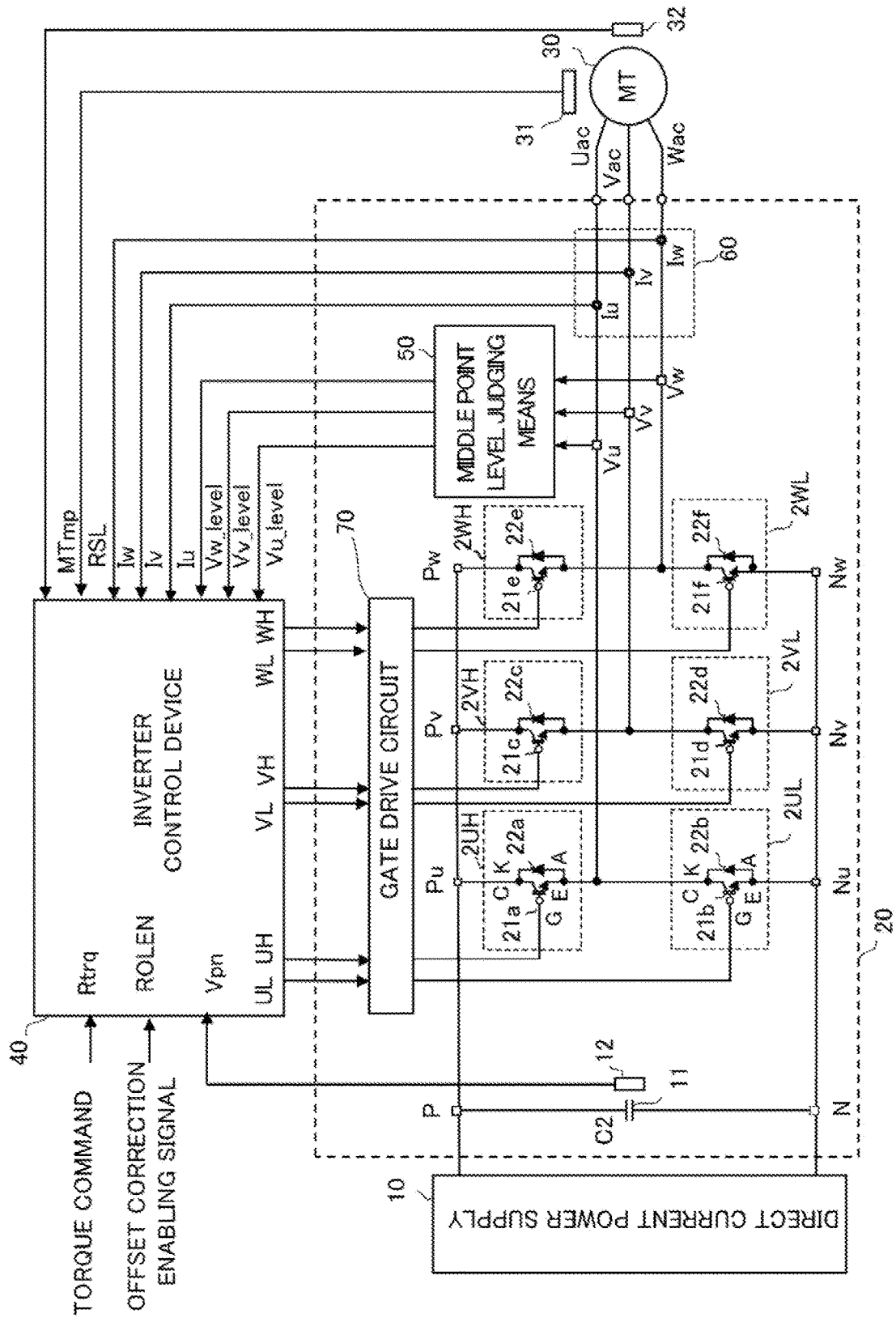
FIG. 1 is a configuration diagram which shows a control device of a permanent magnet type rotating electrical machine, in accordance with an Embodiment of the present application.

FIG. 1 is a configuration diagram showing the overall construction of a motor control device, in accordance with the Embodiment.

[Power Supply]

A direct current power supply 10, which can conduct the charge and discharge of electric power, exchanges electric power with a motor 30, through an inverter 20. It is allowed that a step-up converter is provided between the direct current power supply 10 and the inverter 20, so that the direct current voltage which is supplied from the direct current power supply 10 may be stepped up by DC-DC conversion.

[Motor]

Alternating current voltage which is output from the inverter 20 is applied to the motor 30, and the driving force and braking force of a vehicle is controlled. In the near-by field of the motor 30, there are provided with magnetic pole position detection means 31 for detecting the position of the magnetic pole of a rotor, and temperature detection means 32 for detecting a temperature.

The magnetic pole position detection means 31 is the one which is configured, using a Hall device or an encoder. In addition, the magnetic pole position detection means outputs a signal as a magnetic pole position detection signal RSL, where the signal shows the detection value of a magnetic pole position Or (the rotation angle of a q-axis) from the predetermined standard rotary position of the rotor of the motor 30. It is to be noted that, the detection value of the magnetic pole position Or, which is obtained by the magnetic pole position detection means 31, generally produces an error, to the actual magnetic pole position (the actual angle of rotation of a magnetic pole) of the rotor of the motor 30, due to the attachment error of the magnetic pole position detection means 31 and the like.

[Inverter]

The inverter 20 has a smoothing capacitor 11, PN voltage detection means 12, a plurality of switching elements 2UH, 2UL, 2VH, 2VL, 2WH, and 2WL, a gate drive circuit 70 which drives the plurality of switching elements 2UH, 2UL, 2VH, 2VL, 2WH, and 2WL, current detection means 60, and middle point level judging means 50. In addition, the inverter 20 performs DC-AC electric power conversion between the direct current power supply 10 and the motor 30.

The smoothing capacitor 11, which is connected between a high voltage side node P and a low voltage side node N, is configured so that a direct current voltage may be smoothed.

The PN voltage detection means 12 measures a voltage between the high voltage side node P and the low voltage side node N of the smoothing capacitor 11, that is, the voltage value of the direct current power supply 10. In addition, the PN voltage detection means outputs the power supply voltage value Vpn to the inverter control device 40.

In the inverter 20, a semiconductor switch element and a semiconductor rectifier, which are mutually in inverse parallel connection, are regarded as a unit of power semiconductor elements. Moreover, the body of series connected power semiconductor elements is referred to as an arm. Here, the configuration of the inverter 20 will be explained in detail. Within the inverter 20, arms are prepared whose number corresponds to the phase number of the motor 30 which the inverter drives. As shown in FIG. 1, the inverter 20 consists of three types of switching arms, that is, switching arms 2UH and 2UL of U phase, switching arms 2VH and 2VL of V phase, and switching arms 2WH and 2WL of W phase.

In the U phase switching arms 2UH and 2UL of the inverter 20, an insulated gate bipolar transistor (IGBT) whose material is, for example, Si is employed as the semiconductor switch elements 21a and 21b, and a PiN diode whose material is Si in the same way is employed as the semiconductor rectifiers 22a and 22b. Moreover, other materials are allowed to be used for the semiconductor switch element and the semiconductor rectifier.

The collector electrode C of the semiconductor switch element 21a is connected to the cathode electrode K of the semiconductor rectifier 22a. The emitter electrode E of the semiconductor switch element 21a is connected to the anode electrode A of the semiconductor rectifier 22a. The semiconductor switch element 21a and the semiconductor rectifier 22a are mutually in inverse parallel connection, and form one unit of the power semiconductor element. Moreover, in the same manner, the collector electrode C of the semiconductor switch element 21b is connected to the cathode electrode K of the semiconductor rectifier 22b. The emitter electrode E of the semiconductor switch element 21b is connected to the anode electrode A of the semiconductor rectifier 22b. In this way, the U phase switching arms 2UH and 2UL of the inverter 20 are constructed with power semiconductor elements which are in series connection, where one power semiconductor element consists of a semiconductor switch element 21a and a semiconductor rectifier 22a and the other power semiconductor element consists of a semiconductor switch element 21b and a semiconductor rectifier 22b.

It is to be noted that, the V phase switching arms 2VH and 2VL of the inverter 20 are constructed with power semiconductor elements which are in series connection, where one power semiconductor element consists of a semiconductor switch element 21c and a semiconductor rectifier 22c, and the other power semiconductor element consists of a semiconductor switch element 21d and a semiconductor rectifier 22d. In addition, the W phase switching arms 2WH and 2WL are constructed with power semiconductor elements which are in series connection, where one power semiconductor element consists of a semiconductor switch element 21e and a semiconductor rectifier 22e, and the other power semiconductor element consists of a semiconductor switch element 21f and a semiconductor rectifier 22f.

Moreover, upper arm side power semiconductor elements 2UH, 2VH, and 2WH, and lower arm side power semiconductor elements 2UL, 2VL, and 2WL are contained in the inverter 20. The inverter control device 40 controls the switching operations of the semiconductor switch elements of the upper arm side power semiconductor elements and the lower arm side power semiconductor elements. In addition, the inverter control device adjusts the potentials of connection nodes Uac, Vac, and Wac, which are formed with the motor 30, and then, controls the amount of current which flows into the motor 30.

The gate drive circuit 70 follows an ON-OFF signal (PWM command) from the inverter control device 40. In addition, the gate drive circuit carries out ON and OFF operations of semiconductor switch elements 21a to 21f, which are in the upper arm side power semiconductor elements 2UH, 2VH, and 2WH, and in the lower arm side power semiconductor elements 2UL, 2VL, and 2WL, where the upper arm and the lower arm are switching arms which are contained in the inverter 20.

The current detection means 60 detects currents Iu, Iv, and Iw (phase currents), which flow in the coils of respective phases of the motor 30, and outputs them to the inverter control device 40.

The middle point level judging means 50 compares each of the detected middle point voltage values Vu, Vv, and Vw, with their own reference potential. In addition, the middle point level judging means outputs respective comparison results, which are assigned as Hi or Lo, to the inverter control device 40.

Figure 2:
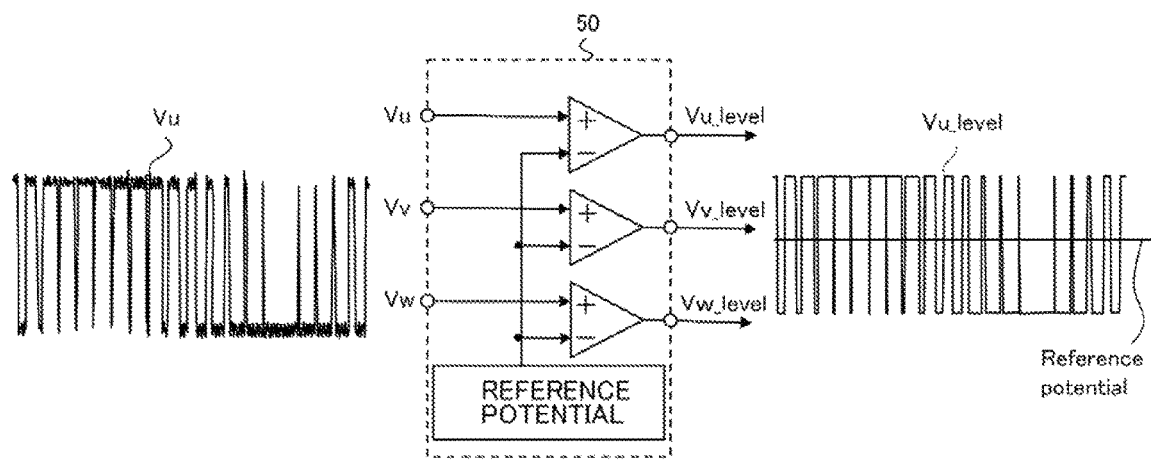
FIG. 2 is a configuration diagram of middle point level judging means, in accordance with the Embodiment of the present application.

FIG. 2 shows the configuration and wave form charts of the middle point level judging means 50 in accordance with the Embodiment. However, the wave form charts show U phase only. A middle point voltage value Vu and a reference potential are compared. When the middle point voltage value Vu is larger than the reference potential, Hi is assigned, and when the middle point voltage value Vu is lower than the reference potential, Lo is assigned. Then, the middle point level judging means outputs the comparison result Vu_level. That is, the middle point level judging means converts the detected voltage into a binary level signal. The same procedure is performed also toward the V phase and the W phase.

FIG. 2 shows the configuration in which a comparator is used. However, as another configuration, for example, a configuration in which an A-D converter is used can be accepted. Moreover, a configuration in which a hysteresis is provided can be accepted, for the comparison with a middle point voltage value and a reference potential.

Figure 3:
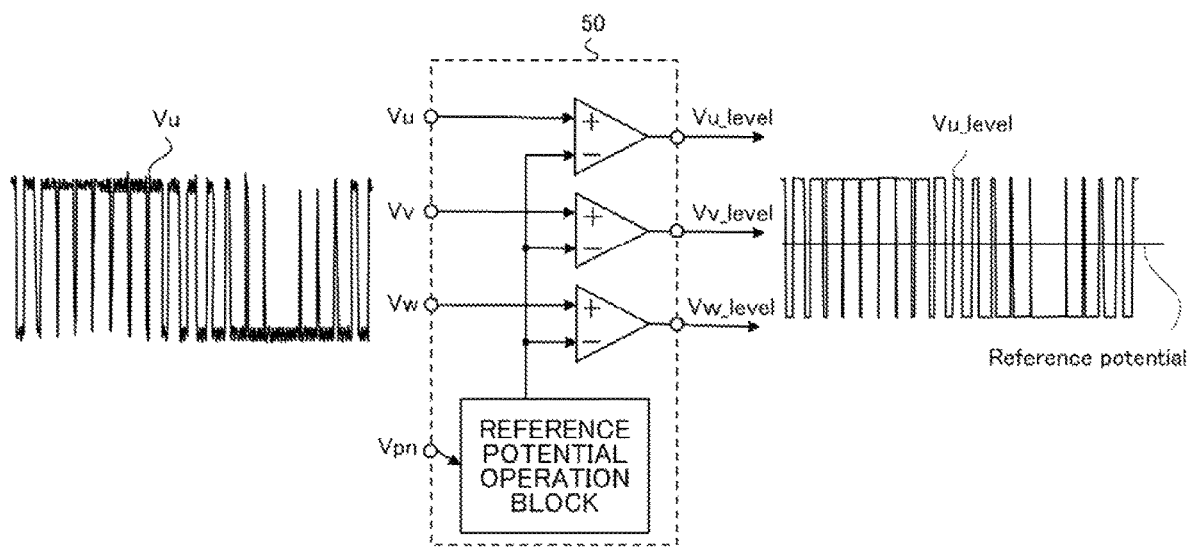
FIG. 3 is a configuration diagram of the middle point level judging means, in accordance with the Embodiment of the present application.

Moreover, as shown in FIG. 3, it allowed to accept a configuration in which a reference potential is computed, based on the power supply voltage value Vpn which is detected by the PN voltage detection means 12 (for example, Vpn [V]×50 [%] is set for a reference potential). By having the configuration shown in this FIG. 3, even when a variation is caused in the power supply voltage value Vpn, the judgement of Hi and Lo can be conducted appropriately.

[Control Device]

Figure 4:
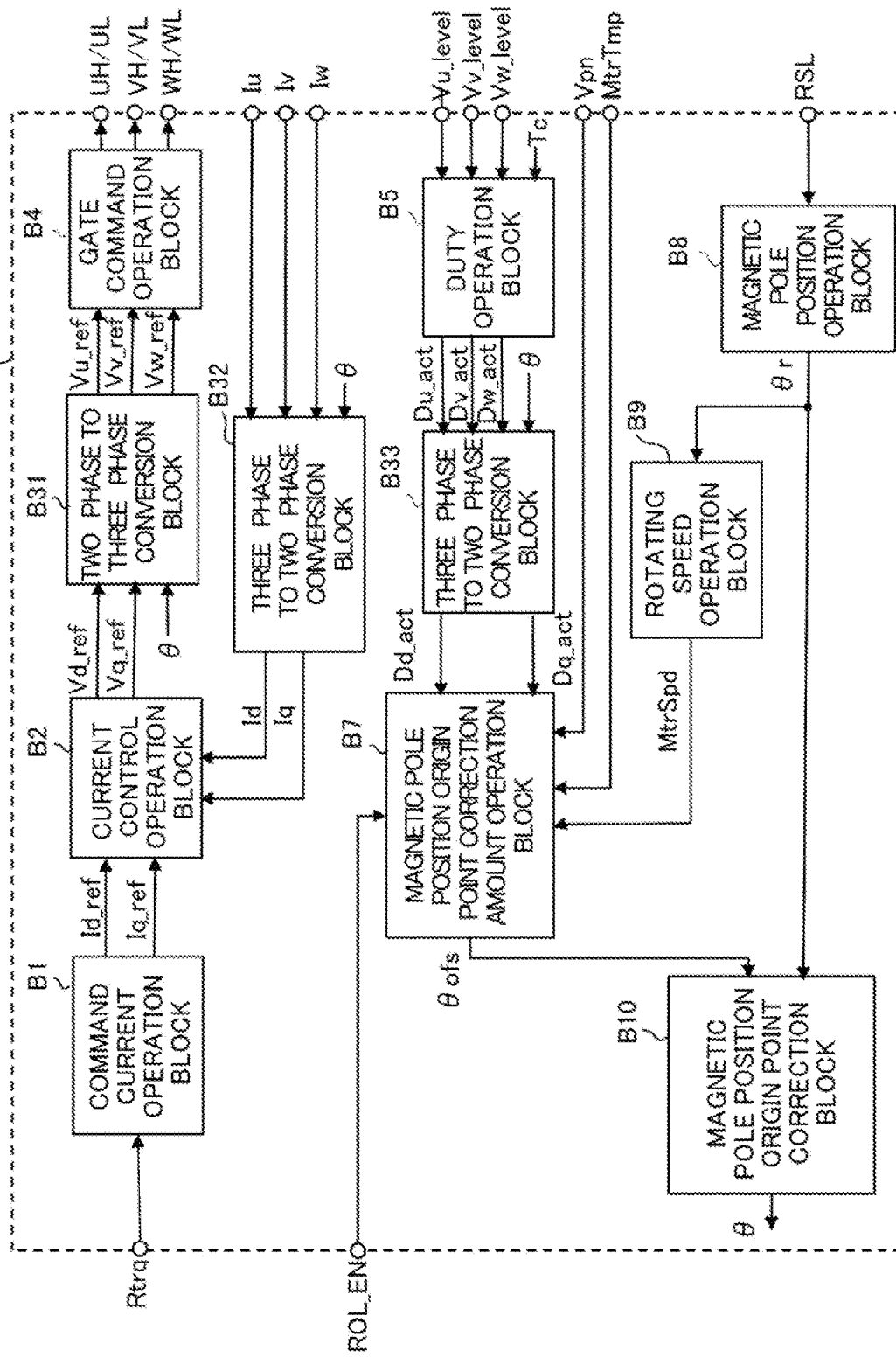
FIG. 4 is a configuration diagram of an inverter control device, in accordance with the Embodiment of the present application.

As shown in FIG. 4, the inverter control device 40 is equipped with an command current operation block B1, a current control operation block B2, a two-phase to three-phase conversion block B31, three-phase to two-phase conversion blocks B32 and B33, a gate command operation block B4, a magnetic pole position origin point correction amount operation block B7, a magnetic pole position origin point correction block B10, a duty operation block B5, a magnetic pole position operation block B8, and a rotating speed operation block B9.

The inverter control device 40 is the one which controls the motor 30 by dq vector control. A torque command value Rtrq is the command value of torque which is to be generated in the motor 30. In response to the torque command value Rtrq (given from the outside of the inverter control device 40), the command current operation block B1, which is inside of this inverter control device 40, computes a d-axis current command value Id_ref and a q-axis current command value Iq_ref, and outputs them to the current control operation block B2.

The current control operation block B2 receives the d-axis current command value Id_ref and q-axis current command value Iq_ref, from the command current operation block B1, and the d-axis current value id and q-axis current value iq, from a three-phase to two-phase conversion block B32. In addition, the current control operation block computes a d-axis voltage command value Vd_ref and a q-axis voltage command value Vq_ref, so that the deviation between the d-axis current value id and the q-axis current value iq may become "0," and outputs the computed command values to a two-phase to three-phase conversion block B31.

Based on the magnetic pole position θ from the magnetic pole position origin point correction block B10, the two-phase to three-phase conversion block B31 converts the d-axis voltage command value Vd_ref and the q-axis voltage command value Vq_ref into three-phase alternating current voltage command values Vu_ref, Vv_ref, and Vw_ref.

Based on the three-phase alternating current voltage command values Vu_ref, Vv_ref, and Vw_ref and a carrier wave (career), the gate command operation block B4 issues an ON-OFF signal to switching elements, outputs them to the gate drive circuit 70, and performs PWM (Pulse Width Modulation) control.

Based on the output θr from the magnetic pole position operation block B8, the rotating speed operation block B9 computes the rotating speed MtrSpd.

[Main]

In the following, explanation will be made about the processing for magnetic pole position origin point correction (ROL: Resolver offset learning, and henceforth referred to as ROL).

In the magnetic pole position origin point correction, the d-axis current command value Id_ref and the q-axis current command value Iq_ref are at first set for 0 [A] in the dq axis vector control, while holding a state in which the motor 30 is rotating (Id_ref=0 [A], Iq_ref=0 [A]).

Figure 5:
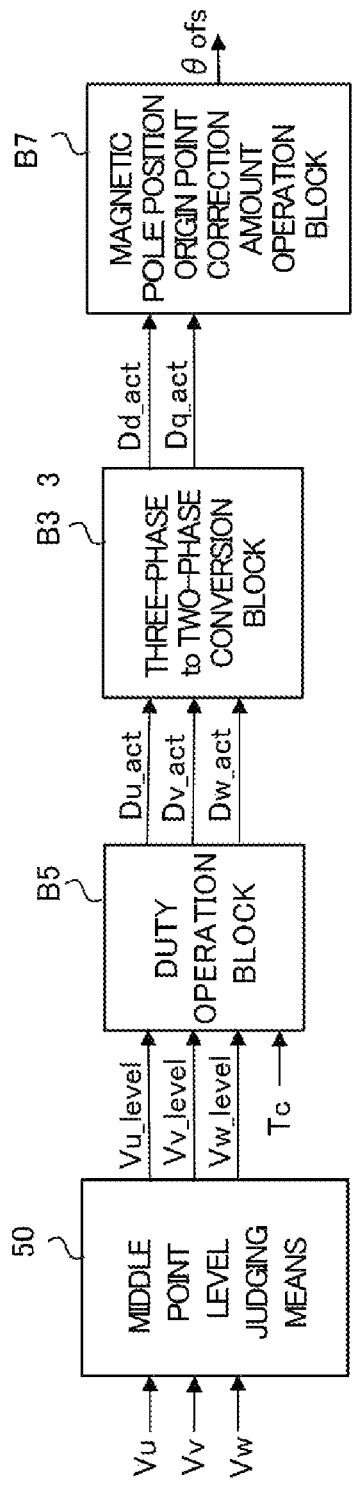
FIG. 5 is a block diagram showing the configuration for performing the calculation of magnetic pole position origin point correction amount, in accordance with the Embodiment of the present application.

Holding the state in which Id_ref=0 [A] and Iq_ref=0 [A], operations according to the flow which is shown in FIG. 5 are performed, and the magnetic pole position origin point correction amount θofs is calculated out from the detected phase voltage values Vu, Vv, and Vw.

As shown in FIG. 5, operations are performed in the middle point level judging means 50, the duty operation block B5, the three-phase to two-phase conversion block B33, and the magnetic pole position origin point correction amount operation block B7.

At first, in the middle point level judging means 50, phase voltage values Vu, Vv, and Vw are converted into binary level signals Vu_level, Vv_level, and Vw_level. In the next, actual duty values Du_act, Dv_act, and Dw_act of respective phases are calculated out in the duty operation block B5.

And in the three-phase to two-phase conversion block B33, the conversion of the two-axis rotating coordinate system is conducted, based on the actual duty values Du_act, Dv_act, and Dw_act, and the value of a magnetic pole position θ, which is an output from the magnetic pole position origin point correction block B10. Then, two-phase signals Dd_act and Dq_act are calculated out. Using these two-phase signals Dd_act and Dq_act, the magnetic pole position origin point correction amount operation block B7 computes the magnetic pole position origin point correction amount θofs, and outputs it.

Figure 6:
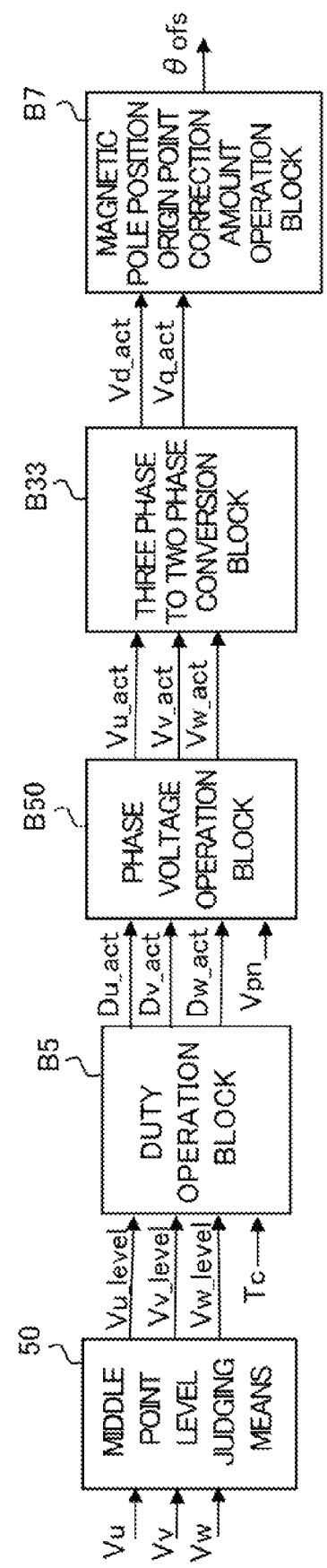
FIG. 6 is a block diagram showing a comparative example of a flow until the calculation out of the magnetic pole position origin point correction amount is performed.

Here, a method for performing a calculation out, which is different from the present application, will be explained as a comparative example. FIG. 6 is a block diagram showing the flow till a magnetic pole position origin point correction amount is output, in which the actual phase voltage waveforms Vu_act, Vv_act, and Vw_act are calculated out from the detected phase voltage values Vu, Vv, and Vw; and the magnetic pole position origin point correction amount θofs is computed from the actual d-axis voltage Vd_act and the actual q-axis voltage Vq_act.

Here, the comparative example is equipped with the middle point level judging means 50, the duty operation block B5, the phase voltage operation block B50, the three-phase to two-phase conversion block B33, and the magnetic pole position origin point correction amount operation block B7. In addition, the comparative example is configured to compute and output the magnetic pole position origin point correction amount θofs, from the real d-axis voltage Vd_act and the real q-axis voltage Vq_act, based on actual duty values Du_act, Dv_act, and Dw_act, and the power supply voltage value Vpn.

In this comparative example, the power supply voltage value Vpn is used. Therefore, when a case is assumed in which a power supply voltage value is unstable, the usage is restricted. In contrast, according to the Embodiment of the present application, there is an advantage that the conditions of use are relaxed.

Because the detected phase voltage values Vu, Vv, and Vw are of pulse waveform, an actual d-axis voltage and an actual q-axis voltage cannot be calculated out appropriately, even if the three-phase to two-phase conversion is performed directly to the detected phase voltage values. Therefore, computations are performed according to a flow as shown in FIG. 6, and the conversion from a pulse waveform to a sine wave is conducted.

Here, the middle point level judging means 50 is configured as shown in FIG. 2. A reference potential is selected as any value between 0 [V] and a minimum voltage of the direct current power supply 10 (a lower limit operation voltage of the inverter 20), at the time when the inverter 20 performs electric power conversion.

When the U phase upper side switching element 2UH is ON (the U phase lower side switching element 2UL is OFF), the middle point level judging means is connected to a high voltage side node P. Therefore, the phase voltage value Vu of U phase is almost the same with the voltage value of the direct current power supply 10, which is equal to or higher than a reference potential, and then, the output Vu_level of the middle point level judging means 50 becomes Hi.

On the other hand, when the U phase upper side switching element 2UH is OFF (the U phase lower side switching element 2UL is ON), the middle point level judging means is connected to a low voltage side node N. Therefore, the phase voltage value Vu of U phase becomes 0 [V], which is less than a reference potential, and then, the output Vu_level of the middle point level judging means 50 becomes Lo. The same is true for the V phase and the W phase.

It is to be noted that, the present Embodiment shows the case in which the middle point level judging means 50 is provided out of the inverter control device 40. However, it is allowed that the detected phase voltage values Vu, Vv, and Vw are input into the inverter control device 40, and the same processing as the middle point level judging means 50 is performed by the operations inside the inverter control device 40.

Figure 7:
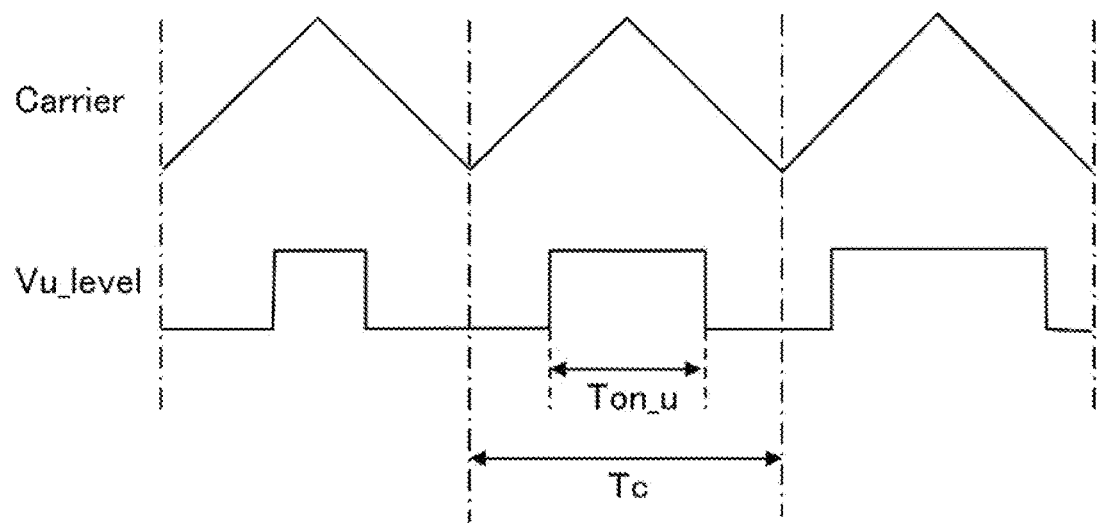
FIG. 7 is an illustrative diagram of a duty operation block, in accordance with the Embodiment of the present application.

As shown in FIG. 7, in the duty operation block B5, times during which the outputs Vu_level, Vv_level, and Vw_level of the middle point level judging means 50 are Hi are counted as ON times Ton_u, Ton_v, and Ton_w, respectively.

In the following, an ON time of switching element per career cycle, that is, a duty value, is calculated out by the following Equation (1), from the carrier wave cycle Tc (carrier cycle), and the ON times Ton_u, Ton_v, and Ton_w.

[Equation 1]

$$Dx\_act = \frac{Ton\_x}{Tc}: 0 \sim 1[-]  \quad \text{※} x = U, V, W \qquad (1)$$

By doing this way, the time during which a switching element actually turns on can be measured. Even in a case where a command duty value and an actual duty value are not in agreement, due to the variations of element characteristics and others, actual duty values Du_act, Dv_act, and Dw_act of respective phases can be calculated out.

Based on the actual duty values Du_act, Dv_act, and Dw_act, and the value of a magnetic pole position θ, which is an output from the magnetic pole position origin point correction block B10, the three-phase to two-phase conversion block B33 conducts the conversion of a two-axis rotating coordinate system, and calculates out the two-phase signals Dd_act and Dq_act.

[Equation 2]

$$\begin{bmatrix} Dd_{act} \\ Dq_{act} \end{bmatrix} = \begin{bmatrix} \cos\theta & \cos\left(\theta - \frac{2}{3}\pi\right) & \cos\left(\theta + \frac{2}{3}\pi\right) \\ -\sin\theta & -\sin\left(\theta - \frac{2}{3}\pi\right) & -\sin\left(\theta + \frac{2}{3}\pi\right) \end{bmatrix} \begin{bmatrix} Du\_act - 0.5 \\ Dv\_act - 0.5 \\ Dw\_act - 0.5 \end{bmatrix} \qquad (2)$$

Using the two-phase signals Dd_act and Dq_act, the magnetic pole position origin point correction amount operation block B7 computes based on the following formula (3), and outputs the magnetic pole position origin point correction amount θofs to the magnetic pole position origin point correction block B10.

[Equation 3]

$$\theta ofs = \operatorname{atan}\left(\frac{Dd\_act}{Dq\_act}\right) \qquad (3)$$

Hereinafter, explanation will be made about the reason why the magnetic pole position origin point correction amount θofs can be calculated out by the Equation (3).

As the following Equation (4) indicates, the magnetic pole position origin point correction amount θofs can be calculated out from art tangent, using the d-axis voltage and the q-axis voltage. It is to be noted that, here, Vd_act and Vq_act denote an actual d-axis voltage and an actual q-axis voltage.

[Equation 4]

$$\theta ofs = \operatorname{atan}\left(\frac{Vd\_act}{Vq\_act}\right) \qquad (4)$$

The actual d-axis voltage Vd_act and the actual q-axis voltage Vq_act can be obtained by the three-phase to two-phase conversion, based on the actual phase voltages Vu_act, Vv_act, and Vw_act, and the magnetic pole position θ.

The three-phase to two-phase conversion from the actual phase voltages Vu_act, Vv_act, and Vw_act, to the actual d-axis voltage Vd_act and the actual q-axis voltage Vq_act is as the following Equation (5).

[Equation 5]

$$\begin{bmatrix} Vd\_act \\ Vq\_act \end{bmatrix} = \begin{bmatrix} \cos\theta & \cos\left(\theta - \frac{2}{3}\pi\right) & \cos\left(\theta + \frac{2}{3}\pi\right) \\ -\sin\theta & -\sin\left(\theta - \frac{2}{3}\pi\right) & -\sin\left(\theta + \frac{2}{3}\pi\right) \end{bmatrix} \begin{bmatrix} Vu\_act \\ Vv\_act \\ Vw\_act \end{bmatrix} \qquad (5)$$

On the other hand, the actual phase voltages Vu_act, Vv_act, and Vw_act can be calculated out by the following Equation (6), based on the actual duties Du_act, DV_act, and DW_act which are calculated out by the Equation (1), and the detection value Vpn of the PN voltage detection means 12.

[Equation 6]

$$Vx\_act = (Dx\_act - 0.5) \times Vpn \qquad (6)$$

※X=U, V, W

When the Equation (6) is applied to the Equation (5), the Equation (7) will be obtained.

[Equation 7]

$$\begin{bmatrix} Vd\_act \\ Vq\_act \end{bmatrix} = \begin{bmatrix} \cos\theta & \cos\left(\theta - \frac{2}{3}\pi\right) & \cos\left(\theta + \frac{2}{3}\pi\right) \\ -\sin\theta & -\sin\left(\theta - \frac{2}{3}\pi\right) & -\sin\left(\theta + \frac{2}{3}\pi\right) \end{bmatrix} \begin{bmatrix} Du\_act - 0.5 \\ Dv\_act - 0.5 \\ Dw\_act - 0.5 \end{bmatrix} \times V_{pn} \qquad (7)$$

Further, when the Equation (2) is applied to the Equation (7) here, the Equation (7) can be transformed like the Equation (8).

[Equation 8]

$$\begin{bmatrix} Vd\_act \\ Vq\_act \end{bmatrix} = \begin{bmatrix} Dd\_act \\ Dq\_act \end{bmatrix} \times V_{pn} \qquad (8)$$

The Equation (4) can be transformed as follows from the Equation (8).

[Equation 9]

$$\theta ofs = \operatorname{atan}\left(\frac{Vq\_act}{Vd\_act}\right) \qquad (9)$$

$$= \operatorname{atan}\left(\frac{Dq\_act \times Vpn}{Dd\_act \times Vpn}\right)$$

-continued $$= \operatorname{atan}\left(\frac{Dq\_act}{Dd\_act}\right)$$

Therefore, the magnetic pole position origin point correction amount can be calculated out by the Equation (3).

The magnetic pole position origin point correction block B10 stores and holds the magnetic pole position correction amount θofs which is from the magnetic pole position origin point correction amount operation block B7. In addition, the magnetic pole position origin point correction block B10 computes the actual magnetic pole position θ, based on an operation equation θ=θr−θofs, by the magnetic pole position correction amount θofs which is stored and held and the magnetic pole position θr which is from the magnetic pole position detection block MB. Further, the magnetic pole position origin point correction block B10 outputs the result to the two-phase to three-phase conversion block B31 and the three-phase to two-phase conversion block B32.

[Processing for Magnetic Pole Position Origin Point Correction (ROL)]

Figure 8:
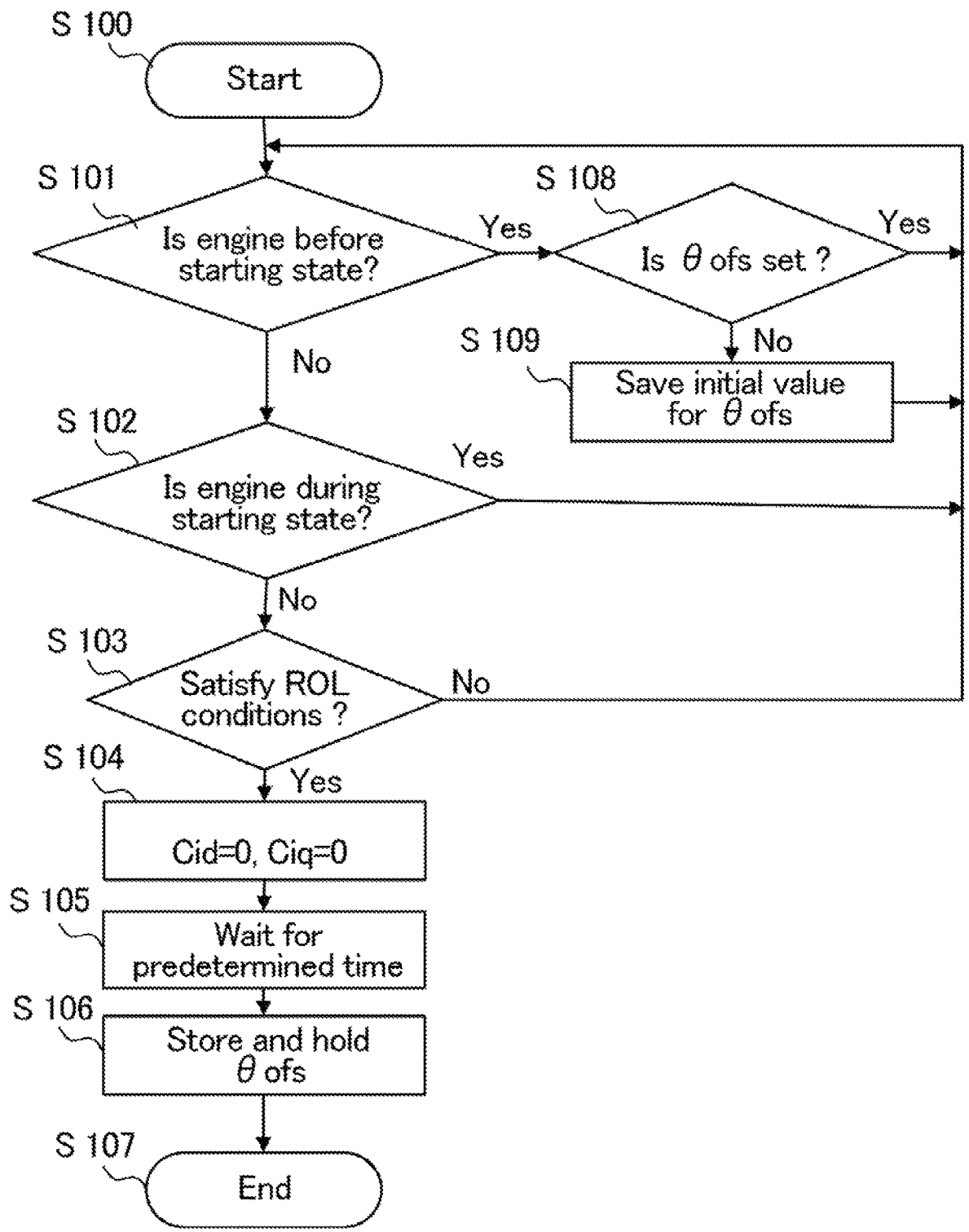
FIG. 8 is a flow chart for illustrating the operation of the control device of the permanent magnet type rotating electrical machine, in accordance with the Embodiment of the present application.
Figure 9:
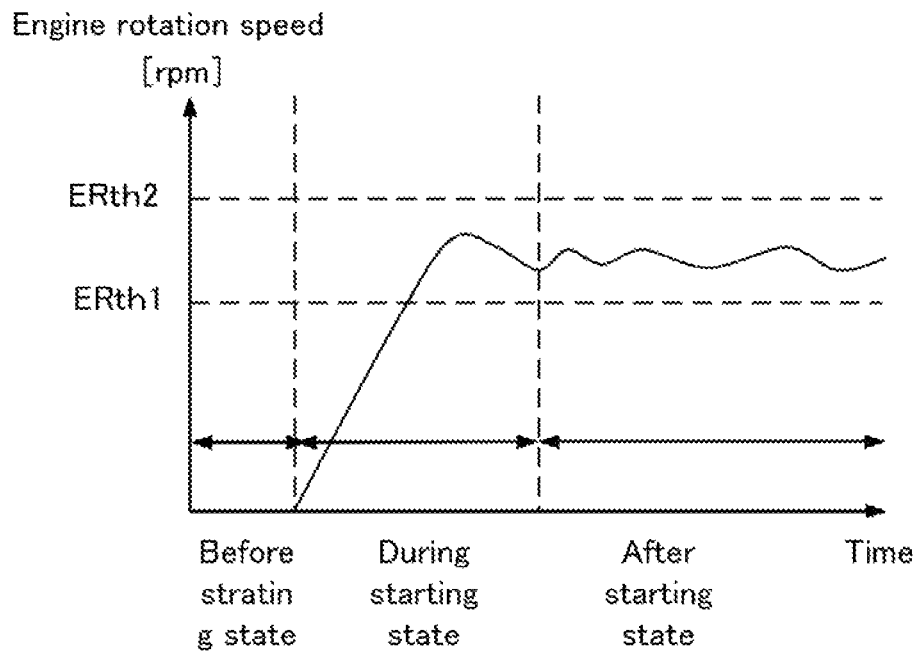
FIG. 9 is an illustrative diagram showing the condition on which the magnetic pole position origin point correction is carried out, in accordance with the Embodiment of the present application.

ROL which is mentioned above is executed as shown in the flow chart of FIG. 8.

First of all, the process starts in the Step S100, and in the Step S101, the operating state of an engine is acquired. If the engine is before the starting state, the process will proceed to the Step S108, and if the engine is not before the starting state, the process will proceed to the Step S102.

In the Step S108, when ROL is already executed and the magnetic pole position correction amount θofs is set, the process proceeds to the Step S101 again, and repeats the operation mentioned above. When the magnetic pole position correction amount θofs is not set, an initial value is saved in the Step S109, for the magnetic pole position correction amount θofs. It is desired that this initial value is a value which is based on the tolerance or attachment accuracy of the magnetic pole position detection means 31.

In the Step S102, the operating state of an engine is acquired. If the engine is during the starting state, the process will proceed to the Step S101, and will repeat the operation mentioned above. When the engine is in the starting state, an initial value is set for the magnetic pole position correction amount θofs. Thereby, though an optimal torque may not be generated in some cases, torque which is required for the start of the engine can be obtained. When the engine is not during the starting state (after the start), the process will proceed to the Step S103.

That is, while the engine is from before the starting state to after the starting state, the rotation speed of the engine changes, as is shown in FIG. 7. It is obvious that, the rotation speed of the engine is zero, when the engine is before the starting state. When the engine is during the starting state, the number of rotations becomes larger than a predetermined number of the rotation, and goes into a stable state. When the engine is after the starting state, there arises a state in which the number of rotations pulsates within a stable range. Corresponding to the number of rotations of this engine, for example, if the state in which the rotation speed of the engine is within the range of ERth1 to ERth2 continues for a predetermined time, the magnetic pole position origin point correction amount will be computed. That is, the magnetic pole position origin point correction is performed, when the rotation speed of a permanent magnet type rotating electrical machine is in a fixed state. Thereby, the magnetic pole position origin point correction can be performed with a sufficient accuracy, avoiding the conditions on which the accuracy of operations deteriorates.

In the Step S103, it is judged whether the condition to carry out the ROL is satisfied, and when the condition is satisfied, the process will proceed to the Step S104. When the condition is not satisfied, the process will proceed to the Step S101, and repeats the operation which is mentioned above.

In the Step S104, the d-axis current command value Id_ref and the q-axis current command value Iq_ref are set for zero. As a result, the armature current which flows through each of the phases U, V, and W of the motor 30 is controlled to be substantially zero.

In the Step S105, the process waits until the armature current of each phase of the motor 30 is fully converged to near the zero. After a standby time is passed which is set beforehand, the magnetic pole position correction amount θofs is calculated out, and the process proceed to the Step S106. Or, after the standby time which is set beforehand is passed, if the d-axis current id and the q-axis current iq are constant, the process will proceed to the Step S106. When the armature current does not converge to a constant value, the process will end procedures. The magnetic pole position origin point correction is performed, when the d-axis current and the q-axis current are in a fixed state. Thereby, the magnetic pole position origin point correction can be performed with a sufficient accuracy, avoiding the conditions on which the accuracy of operations deteriorates.

In the Step S106, the magnetic pole position origin point correction block B10 stores and holds the magnetic pole position correction amount θofs which is calculated out in the magnetic pole position origin point correction amount operation block B7, and in the Step S107, the process ends the ROL processing. Here, it is to be noted that, it is allowed that the magnetic pole position correction amount θofs is restricted so that the magnetic pole position correction amount θofs may fall within the range of a threshold value which is determined beforehand. In this step S106, the magnetic pole position correction amount θofs which is stored and held in the magnetic pole position origin point correction block B10 is computed with the magnetic pole position θr, and calculates out an actual magnetic pole position θ.

The processing of ROL, which is explained until now, calculates out the magnetic pole position correction amount θofs, based on the middle point voltage of an inverter. Thereby, the exact correction of a magnetic pole position can be attained, and the decline of power factor and efficiency can be reduced.

Moreover, the middle point level judging means 50 is allowed to employ the configuration in which a reference potential is calculated out based on the PN voltage Vpn which is detected by the PN voltage detection means 12, as shown in FIG. 3.

If the reference potential is not set to the value between the P side potential and the N side potential (within the voltage range of the direct current power supply 10), the output of the middle point level judging means will be not appropriately output. For example, in the case where the reference potential is a value larger than the P side potential, the output of the middle point level judging means always becomes Lo.

Suppose that the configuration is employed in which the reference potential is determined based on the PN voltage Vpn, as shown in FIG. 3. When the direct current power supply is exchanged to another one which is different in output voltage, the reference potential will be adjusted automatically, without changing the reference potential, and Hi and Lo can be judged appropriately.

One requisite for the implementation of the ROL in the Step S103 can be that the ROL is implemented, when the offset correction enabling signal ROL_EN, which is shown in FIG. 1, is permission. In this way, the magnetic pole position origin point correction is performed based on an enabling signal. Thereby, when the process enters the calculation processing of an origin point position, unintended torque fluctuations can be prevented from occurring.

Moreover, another requisite for implementing the ROL can be that the rotation speed of the motor 30 which is detected by the magnetic pole position detection means 31 of FIG. 1 falls within the range of a threshold value which is set beforehand. Or, it is allowed to set another requisite that the voltage value Vpn between the high voltage side node P and low voltage side node N of the smoothing capacitor 11, which is detected by the PN voltage detection means 12 shown in FIG. 1, falls within the range of a threshold value which is set beforehand.

Figure 10:
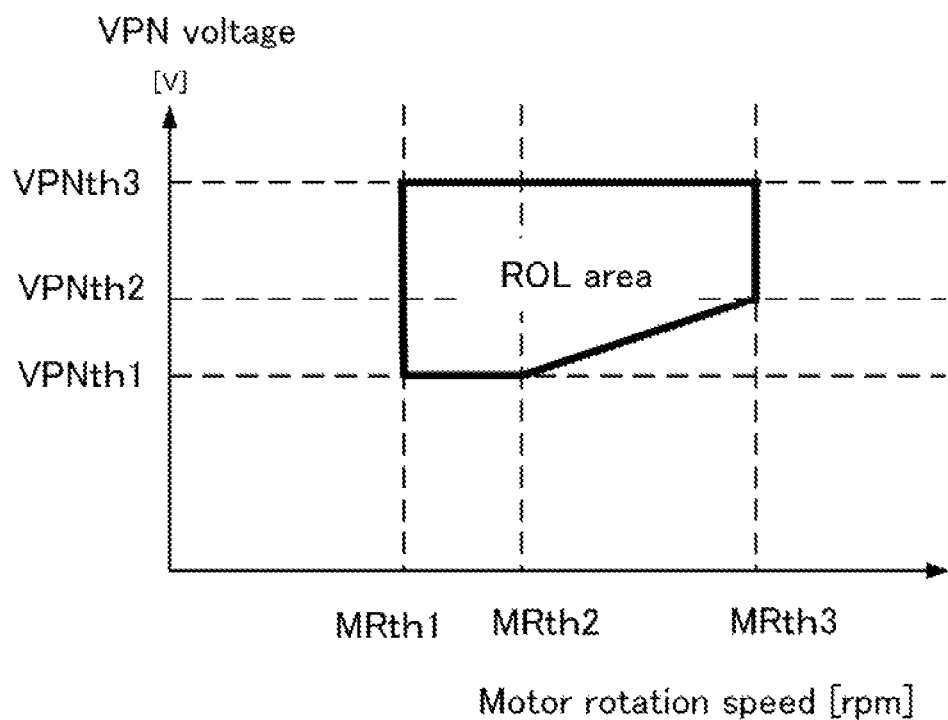
FIG. 10 is an illustrative diagram showing the condition on which the magnetic pole position origin point correction is carried out, in accordance with the Embodiment of the present application.

FIG. 10 shows an example of a case in which the relation between the rotation speed of the motor 30 and the voltage value Vpn is within the range of a threshold value which is determined beforehand.

In the motor 30, since an induced voltage is generated in proportion to the rotation speed, it is likely that the induced voltage of the motor 30 may exceed the voltage of a direct current power supply, when the motor rotates at a high rotation speed.

In such a case, it is required to control the d-axis current as a negative value, and the d-axis current and the q-axis current do not become 0 [A]. When the d-axis current and the q-axis current are both 0 [A], the Equation (3) and the Equation (4) can produce right operation results. Therefore, when neither the d-axis current nor the q-axis current is 0 [A], correct operation results cannot be obtained.

One solution is to establish a condition in which the calculation of the magnetic pole position correction amount is permitted based on the voltage value Vpn and the rotation speed of the motor (ROL area, the range shown in FIG. 10), and the condition for a starting is that the state in which values are in the ROL area continues for a predetermined time. By calculating the magnetic pole position correction amount to meet those requirements, the magnetic pole position correction amount can be calculated out with a sufficient accuracy, avoiding the conditions on which the accuracy of operations deteriorates.

Moreover, it is allowed to set as a requisite for implementing the ROL that the rotation speed of the motor 30, which is calculated out from the magnetic pole position detection means 31 which is shown in FIG. 1, is constant.

Moreover, when the above-mentioned threshold value of the rotation speed of the motor 30 is changed according to the temperature of the motor 30 or the temperature of a magnet which is detected by the temperature detection means 32 of FIG. 1, the magnetic pole position origin point correction can be performed with a sufficient accuracy, avoiding the conditions on which the accuracy of operations deteriorates.

Moreover, provided that the voltage Vpn which is detected by the PN voltage detection means 12 of FIG. 1 is constant, it is allowed that, only in a case where the voltage Vpn is almost constant, the magnetic pole position correction amount is calculated out to perform the control. It is to be noted that, when the voltage value Vpn fluctuates and is not stable, a duty output and a voltage output are not appropriately produced, and it also becomes difficult to control the d-axis current and the q-axis current to 0 [A]. Thereby, the magnetic pole position correction amount cannot be calculated out with a sufficient accuracy. In this way, only in the case where the voltage of a direct current power supply is almost constant, the magnetic pole position origin point correction is performed. Thereby, the magnetic pole position origin point correction can be performed with a sufficient accuracy, avoiding the conditions on which the accuracy of operations deteriorates.

Figure 11:
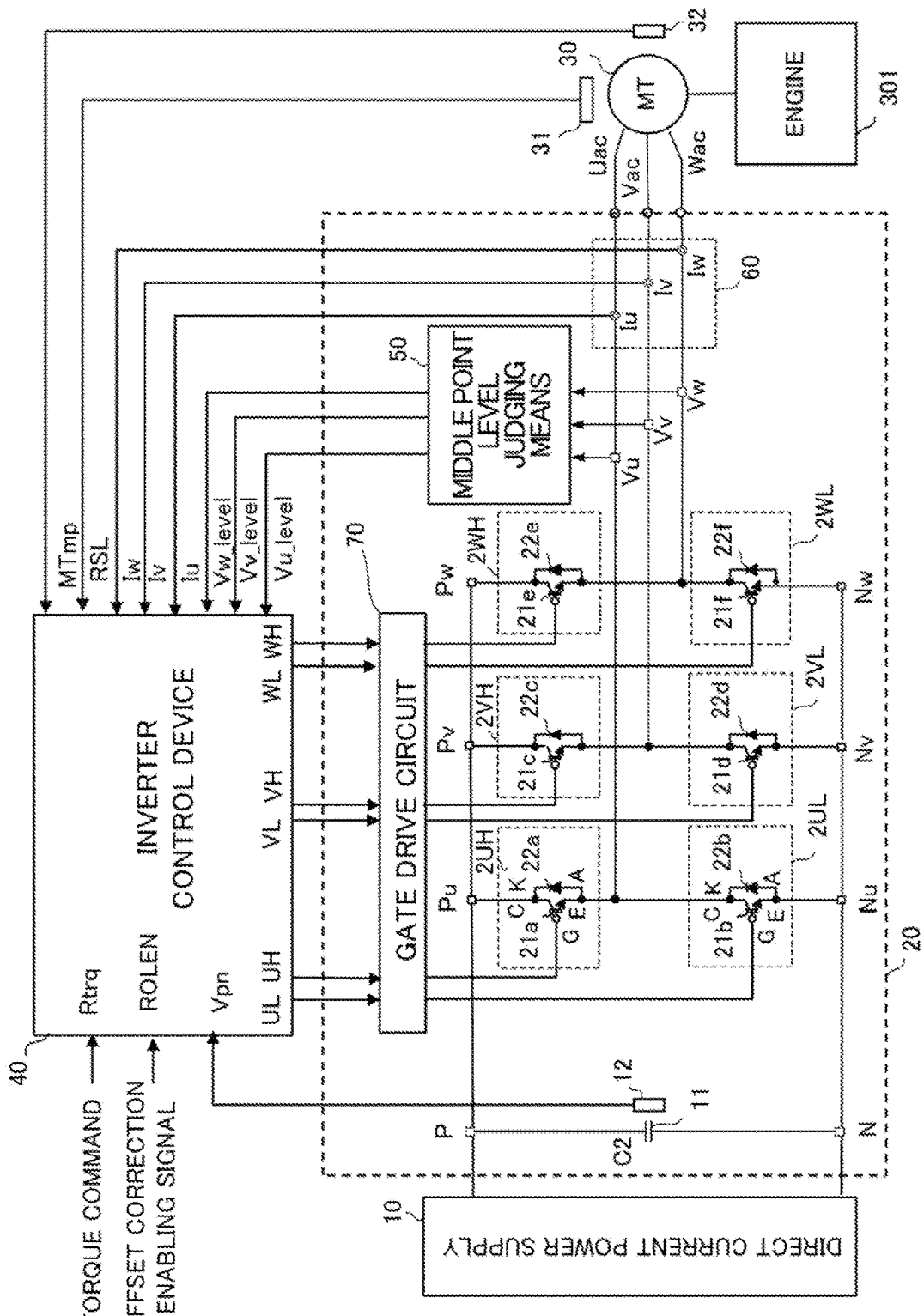
FIG. 11 is a configuration diagram showing the control device of the permanent magnet type rotating electrical machine, in accordance with the Embodiment of the present application.

It is to be noted that, in the above-mentioned Embodiment, the permanent magnet type rotating electrical machine is explained as a motor. In addition, explained is a case where the control device of the permanent magnet type rotating electrical machine is mounted in a hybrid car, as a motor control device. However, in a case where the motor control device is mounted in a hybrid car, the motor 30 is connected, as shown in FIG. 11, with the output axis (the driving shaft) of the engine 301, and the start of a motor activates the engine to move. Moreover, a state will be established in which the motor 30 is rotated with the engine 301.

In such a case, the control device may include a starting time control means 401 in the inverter control device 40, to which a temporary correction value (a first correction value) is set. After a predetermined time has passed from the starting of the engine 301 by the motor 30, the suitable control of the motor 30 can be performed by conducting the magnetic pole position origin point correction, based on a middle point potential detection.

That is, until when the rotation of the motor 30 becomes a predetermined state, the control device performs the control of a motor, using a first correction value. In addition, when the rotation becomes a predetermined state, the control device performs the magnetic pole position origin point correction based on the middle point potential detection. Such a starting of the engine 301 is required in order to enable the engine 301 to start by the motor 30, even if the process is before the magnetic pole position origin point correction.

Figure 12:
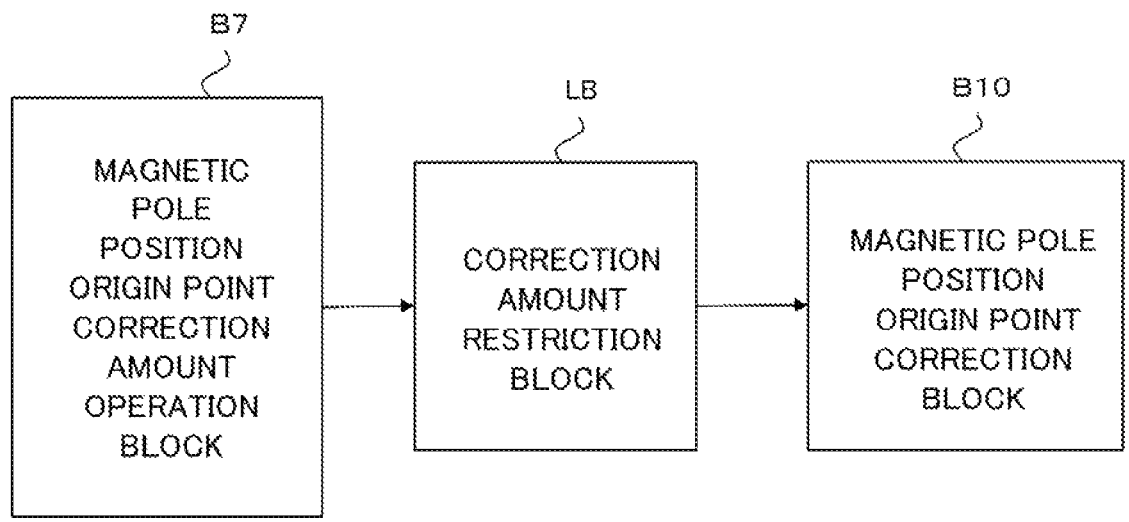
FIG. 12 is a block diagram showing the schematic structure of the control device, in accordance with the Embodiment of the present application.

Moreover, in the inverter control device 40 which is shown in FIG. 4, a magnetic pole position correction amount θofs, which is an output of the magnetic pole position origin point correction amount operation block B7, is provided, as it is, to the magnetic pole position origin point correction block B10. However, as a measure for a case where this correction amount becomes extremely large by a certain cause, the correction amount restriction block LB can be provided at the output of the magnetic pole position origin point correction amount operation block B7, as shown in FIG. 12. Thus, the inverter control device can correspond to the case, even when the magnetic pole position correction amount θofs becomes an unexpected value.

When a defect is generated in the middle point level judging means 50 or the like, it is likely that the calculated out correction amount may deviate largely from a required value. In such a case, the error of torque will become larger rather than before the correction. Therefore, for example, a threshold value is determined based on the tolerance of the magnetic pole position detection means 31 or the accuracy of attachment position or the like. In the case where an output value exceeds the threshold value, control is continued using the value before the correction, and the display of a failure becomes possible to be performed.

Figure 13:
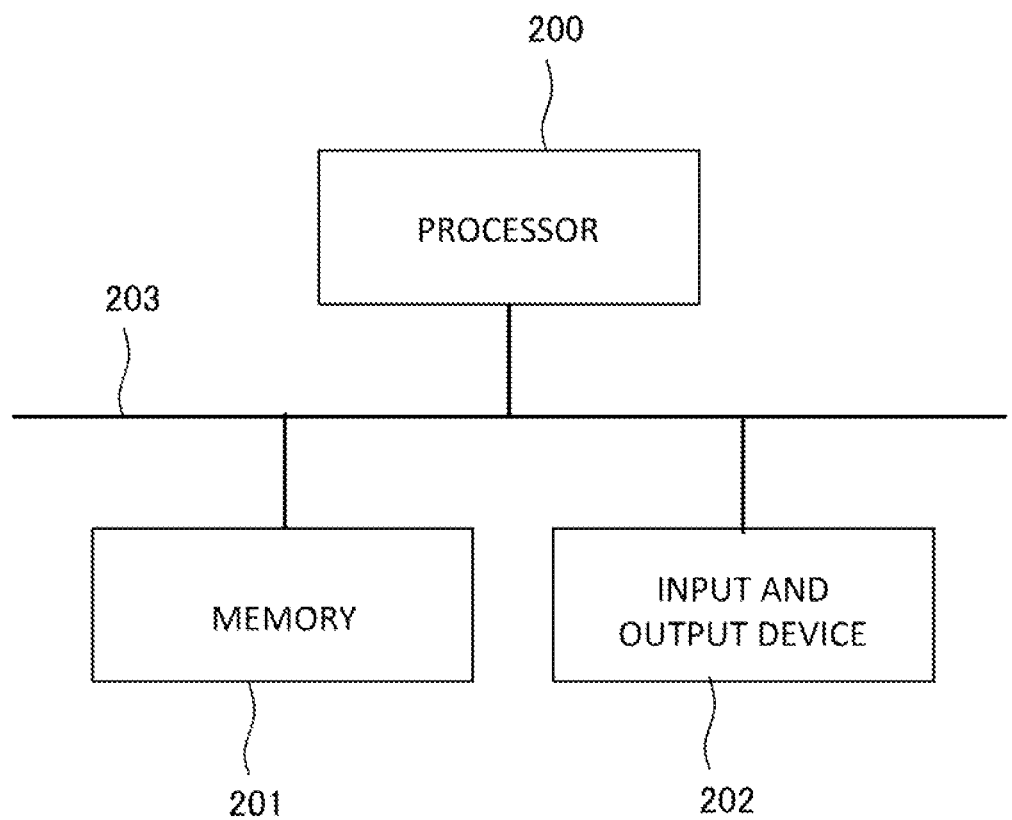
FIG. 13 is a block diagram showing the schematic structure of the control device, in accordance with the Embodiment of the present application.

It is to be noted that, the inverter control devices which are shown in FIG. 1 and FIG. 4 are accomplished by the hardware which is shown in FIG. 13. That is, the inverter control device is configured of a processor 200, a memory 201 which stores a program and data, an input and output device 202, and a data bus 203 which connects them. Although the contents of the memory 201 are not illustrated, the memory is provided with a volatile storage unit, such as a random access memory, and an auxiliary storage unit, such as a flash memory. Moreover, the memory is provided with an auxiliary storage unit of hard disk type, instead of a flash memory. The processor 200 executes the program which is input from the memory 201. In this case, the program is input from the auxiliary storage unit to the processor 200, through the volatile storage unit. Moreover, the processor 200 may output the data on the operation result and the like to the volatile storage unit of the memory 201, and may save the data in the auxiliary storage unit through the volatile storage unit.

Although the present application is described above in terms of an exemplary embodiment, it should be understood that the various features, aspects and functionality described in the embodiment are not limited in their applicability to the particular embodiment with which they are described, but instead can be applied, alone or in various combinations to the embodiment.

It is therefore understood that numerous modifications which have not been exemplified can be devised without departing from the scope of the present application. For example, at least one of the constituent components may be modified, added, or eliminated.

EXPLANATION OF NUMERALS AND SYMBOLS

10 Direct current power supply; 11 Smoothing capacitor; 12 PN voltage detection means; 20 Inverter; 30 Motor; 31 Magnetic pole position detection means; 32 Temperature detection means; 40 Inverter control device; 50 Middle point level judging means; 60 Current detection means; 70 Gate drive circuit; 200 Processor; 201 Memory; 202 Input and output device; 203 Data bus; 301 Engine; B1 Command current operation block; B2 Current control operation block; B31 Two-phase to three-phase conversion block; B32 Three-phase to two-phase conversion block; B33 Three-phase to two-phase conversion block; B4 Gate command operation block; B5 Duty operation block; B7 Magnetic pole position origin point correction amount operation block; B8 Magnetic pole position operation block; B9 Rotating speed operation block; B10 Magnetic pole position origin point correction block; B50 Phase voltage operation block; LB Correction amount restriction block

What is claimed is:

1. A controller of a permanent magnet type rotating electrical machine, the controller comprising:
    magnetic pole position detector which detects a magnetic pole position of the permanent magnet type rotating electrical machine;
    an inverter connected to a direct current power supply, and which performs PWM control of switching elements based on a carrier wave and performs electric power conversion;
    a middle point level judge which:
        detects a middle point potential between a switching element connected to an anode side of the inverter and a switching element connected to a cathode side of the inverter,
        compares the middle point potential and a reference potential,
        outputs as Hi, when the middle point potential is higher than the reference potential, and
        outputs as Lo when the middle point potential is lower than the reference potential; and
    a magnetic pole position origin point correction amount operator:
        keeping both of a d-axis current command value and a q-axis current command value at zero in dq vector control in a state where the permanent magnet type rotating electrical machine is rotating;
        counts a time during which an output of the middle point level judge is Hi and calculates a duty value from a ratio with a carrier wave cycle;
        converts the calculated duty value corresponding to a three-phase signal and the magnetic pole position directly into a two-axis rotating coordinate system and calculates duty value corresponding to a two-phase signal;
        calculates a magnetic pole position origin point correction amount from the two-phase signal, and
        performs a magnetic pole position origin point correction using the calculated magnetic pole position origin point correction amount, and without using a PN voltage of the connected direct current power supply.

2. The controller of the permanent magnet type rotating electrical machine according to claim 1, wherein the reference potential is a predetermined fixed value.

3. The controller of the permanent magnet type rotating electrical machine according to claim 1,
    wherein the inverter is further equipped with PN voltage detector which detects a voltage of the connected direct current power supply; and
    wherein only the reference potential is calculated based on the PN voltage which is detected by the PN voltage detector.

4. The controller of the permanent magnet type rotating electrical machine according to claim 3,
    wherein the magnetic pole position origin point correction is performed, when a voltage of the direct current power supply falls within a predetermined voltage value.

5. The controller of the permanent magnet type rotating electrical machine according to claim 3,
    wherein the magnetic pole position origin point correction is performed, when a voltage of the direct current power supply is in a fixed state.

6. The controller of the permanent magnet type rotating electrical machine according to claim 1,
    wherein the magnetic pole position origin point correction is performed, when a rotation speed of the permanent magnet type rotating electrical machine falls within predetermined rotation speed range.

7. The controller of the permanent magnet type rotating electrical machine according to claim 6,
    wherein a threshold value of the rotation speed is changed according to a magnet temperature of the permanent magnet type rotating electrical machine.

8. The controller of the permanent magnet type rotating electrical machine according to claim 1,
    wherein the magnetic pole position origin point correction is performed, when a rotation speed of the permanent magnet type rotating electrical machine is in a fixed state.

9. The controller of the permanent magnet type rotating electrical machine according to claim 1,
    wherein the magnetic pole position origin point correction is performed, when a d-axis current and a q-axis current are in a fixed state.

10. The controller of the permanent magnet type rotating electrical machine according to claim 1,
  wherein the magnetic pole position origin point correction is performed based on an enabling signal.

11. The controller of the permanent magnet type rotating electrical machine according to claim 1,
  wherein, when the magnetic pole position origin point correction is not completed in a state where the permanent magnet type rotating electrical machine is connected with an axle shaft, the magnetic pole position origin point correction is performed with a predetermined temporary correction value.

12. The controller of the permanent magnet type rotating electrical machine according to claim 1,
  wherein the magnetic pole position origin point correction restricts a correction amount so that the calculated magnetic pole position may fall within a predetermined angular range.

* * * * *